(12) United States Patent
Chiang et al.

(10) Patent No.: US 9,870,143 B2
(45) Date of Patent: Jan. 16, 2018

(54) HANDWRITING RECOGNITION METHOD, SYSTEM AND ELECTRONIC DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Chih-San Chiang, New Taipei (TW); Hai-Jun Mao, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 233 days.

(21) Appl. No.: 14/797,789

(22) Filed: Jul. 13, 2015

(65) Prior Publication Data

US 2016/0349980 A1 Dec. 1, 2016

(30) Foreign Application Priority Data

May 26, 2015 (CN) .......................... 2015 1 0273330

(51) Int. Cl.
*G06K 9/00* (2006.01)
*G06F 3/0488* (2013.01)
*G06K 9/22* (2006.01)

(52) U.S. Cl.
CPC ......... *G06F 3/04883* (2013.01); *G06K 9/222* (2013.01)

(58) Field of Classification Search
None
See application file for complete search history.

(56) References Cited

U.S. PATENT DOCUMENTS

| | | | | |
|---|---|---|---|---|
| 5,020,117 A | * | 5/1991 | Ooi | G06K 9/685 382/185 |
| 5,442,715 A | * | 8/1995 | Gaborski | G06K 9/344 382/156 |
| 5,509,092 A | * | 4/1996 | Hirayama | G06K 9/033 382/177 |
| 5,717,794 A | * | 2/1998 | Koga | G06K 9/00442 382/177 |
| 5,933,525 A | * | 8/1999 | Makhoul | G06K 9/00879 382/185 |
| 6,018,736 A | * | 1/2000 | Gilai | G06F 17/30654 |

(Continued)

FOREIGN PATENT DOCUMENTS

TW 201426513 A 7/2014

*Primary Examiner* — Iman K Kholdebarin
(74) *Attorney, Agent, or Firm* — ScienBiziP, P.C.

(57) ABSTRACT

In a handwriting recognition method applied in an electronic device with touch screen and display screen, a handwriting input area and a handwriting display area are shown on a touch screen when a handwriting command is given. The handwriting of a complete or partial word in the handwriting input area is recognized and displayed and a new handwriting input area can be added when a preset slide operation is applied that the tracing of a handwritten character collides with a boundary of the input area. Handwriting in the new handwriting input area is recognized and displayed and the content of the original handwriting input area and of the new handwriting input area are combined to form a complete word when the handwriting input is finished. The complete word is then displayed.

16 Claims, 7 Drawing Sheets

(56) References Cited

U.S. PATENT DOCUMENTS

| | | | | |
|---|---|---|---|---|
| 6,038,337 | A * | 3/2000 | Lawrence | G06K 9/4628 |
| | | | | 382/155 |
| 6,400,845 | B1 * | 6/2002 | Volino | G06K 9/2054 |
| | | | | 358/462 |
| 7,072,514 | B1 * | 7/2006 | Thouin | G06K 9/6835 |
| | | | | 382/176 |
| 9,256,592 | B1 * | 2/2016 | Shanmugasundaram | G06F 17/273 |
| 2004/0168131 | A1 * | 8/2004 | Blumberg | G06F 3/0237 |
| | | | | 715/261 |
| 2004/0208376 | A1 * | 10/2004 | Shi | G06K 9/4609 |
| | | | | 382/218 |
| 2006/0284851 | A1 * | 12/2006 | Pittman | G06F 3/04883 |
| | | | | 345/173 |
| 2010/0033772 | A1 * | 2/2010 | Borison | G06T 3/0031 |
| | | | | 358/474 |
| 2010/0054605 | A1 * | 3/2010 | Molnar | G06K 9/00469 |
| | | | | 382/190 |
| 2011/0280481 | A1 * | 11/2011 | Radakovic | G06K 9/033 |
| | | | | 382/177 |
| 2013/0106693 | A1 * | 5/2013 | Okuyama | G06F 3/0482 |
| | | | | 345/157 |
| 2014/0002383 | A1 * | 1/2014 | Hsieh | G06F 3/017 |
| | | | | 345/173 |
| 2014/0068495 | A1 * | 3/2014 | He | G06F 3/04883 |
| | | | | 715/780 |
| 2014/0105503 | A1 * | 4/2014 | Motoi | G06K 9/00402 |
| | | | | 382/187 |
| 2015/0193141 | A1 * | 7/2015 | Goldsmith | G06F 3/04883 |
| | | | | 345/173 |
| 2015/0302084 | A1 * | 10/2015 | Stewart | G06F 17/30705 |
| | | | | 707/776 |

* cited by examiner

HANDWRITING RECOGNITION METHOD, SYSTEM AND ELECTRONIC DEVICE

CROSS-REFERENCE TO RELATED APPLICATIONS

This application claims priority to Chinese Patent Application No. 201510273330.2 filed on May 26, 2015, the contents of which are incorporated by reference herein.

FIELD

The subject matter herein generally relates to handwriting recognition technologies.

BACKGROUND

Handwriting, as a convenient text input method, has been widely used on portable electronic devices with touch screens for example, on mobile phones. All characters to make a word need to be handwritten one by one.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
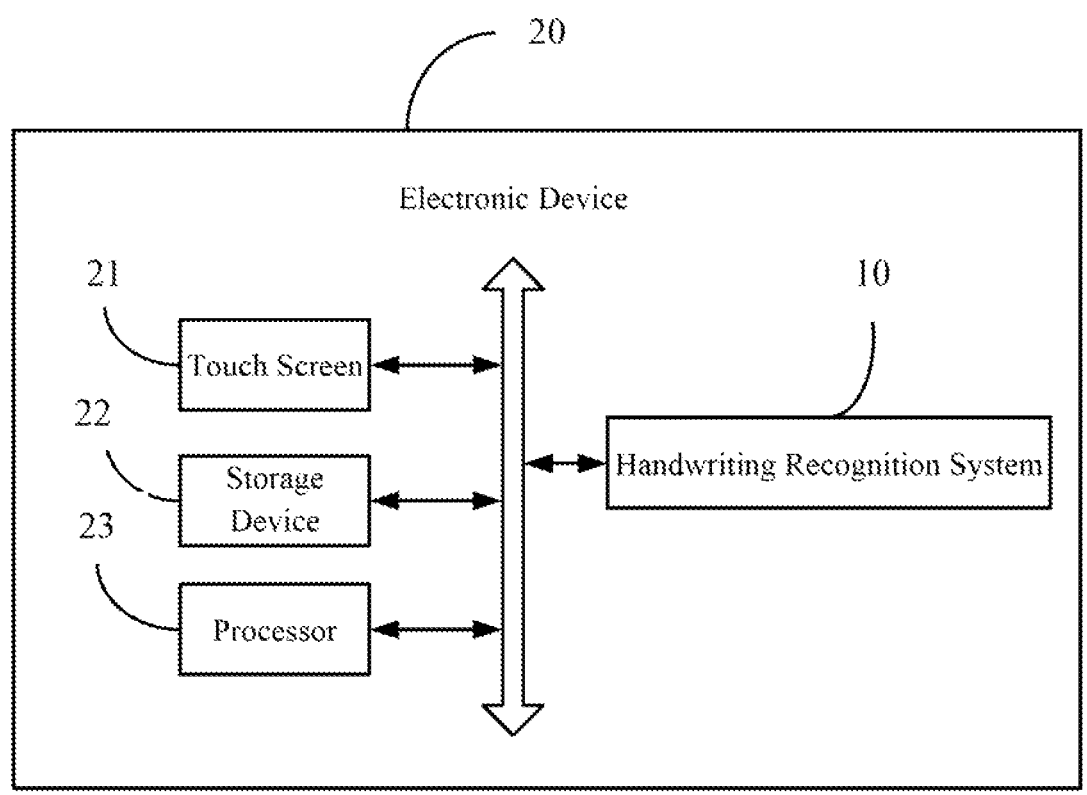
FIG. 1 is a block diagram of one embodiment of a hardware environment for executing a handwriting recognition system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts can be exaggerated to better illustrate details and features of the present disclosure.

Several definitions that apply throughout this disclosure will now be presented.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the word "module," as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprise connected logic units, such as gates and flip-flops, and may comprise programmable units, such as programmable gate arrays or processors. The modules described herein may be implemented as either software and/or hardware modules and may be stored in any type of non-transitory computer-readable storage medium or other computer storage device. The term "comprising," when utilized, means "including, but not necessarily limited to"; it specifically indicates open-ended inclusion or membership in the so-described combination, group, series and the like.

FIG. 1 is a block diagram of one embodiment of a hardware environment for executing a handwriting recognition system. The handwriting recognition system 10 is installed and runs in an apparatus, for example an electronic device 20. In at least one embodiment as shown in FIG. 1, the electronic device 20 includes, but is not limited to, a touch screen 21, a storage device 22, and at least one processor 23. The electronic device 20 can be a tablet computer, a notebook computer, a smart phone, a personal digital assistant (PDA), or other suitable electronic device. FIG. 1 illustrates only one example of the electronic device 20, other examples can include more or fewer components than illustrated, or have a different configuration of the various components in other embodiments.

The handwriting recognition system 10 can determine whether a preset slide operation is applied to a handwriting input area. When the preset slide operation is applied to the handwriting input area, the handwriting recognition system 10 adds a new handwriting input area on the touch screen, and then recognizes handwriting in the new handwriting input area. When a handwriting input is finished, the handwriting recognition system 10 combines the handwriting in the handwriting input area and in the new handwriting input area to form a whole word, and the word is displayed.

In at least one embodiment, the storage device 22 can include various types of non-transitory computer-readable storage mediums. For example, the storage device 22 can be an internal storage system, such as a flash memory, a random access memory (RAM) for temporary storage of information, and/or a read-only memory (ROM) for permanent storage of information. The storage device 22 can also be an external storage system, such as a hard disk, a storage card, or a data storage medium. The at least one processor 23 can be a central processing unit (CPU), a microprocessor, or other data processor chip that performs functions of the handwriting recognition system 10 in the electronic device 20. The touch screen 21 can generate signals in response to touch operations of a user. The touch screen 21 can further be used for displaying information, such as words which have been handwritten.

It is to be understood, in the embodiment, the word includes one or more than one character. The word can be, but is not limited to being, an English word only.

Figure 2:
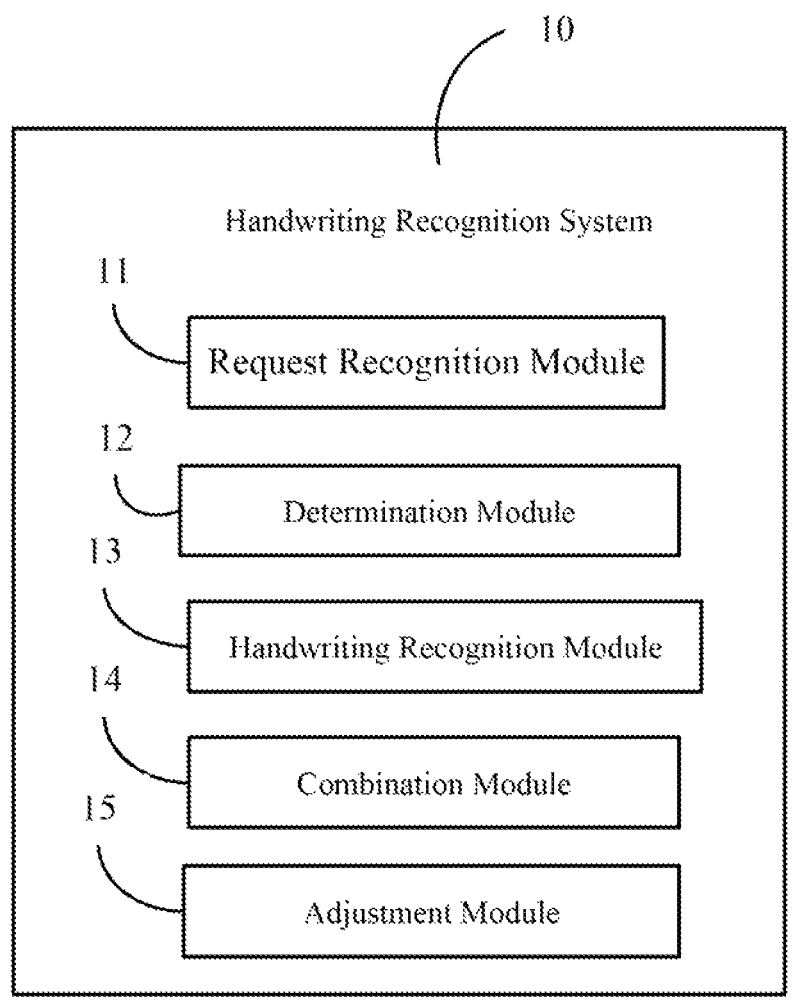
FIG. 2 is a block diagram of one embodiment of function modules of the handwriting recognition system in FIG. 1.

FIG. 2 is a block diagram of one embodiment of the function modules of the handwriting recognition system 10. In at least one embodiment, the management system 10 can include a request recognition module 11, a determination module 12, a handwriting recognition module 13, a combination module 14, and an adjustment module 15. The function modules 11-15 can include computerized codes in the form of one or more programs, which are stored in the storage device 22. The at least one processor 23 executes the computerized codes to provide functions of the function modules 11-15. A detailed description of the functions of the modules 11-15 is given below in reference to FIG. 3.

Figure 3:
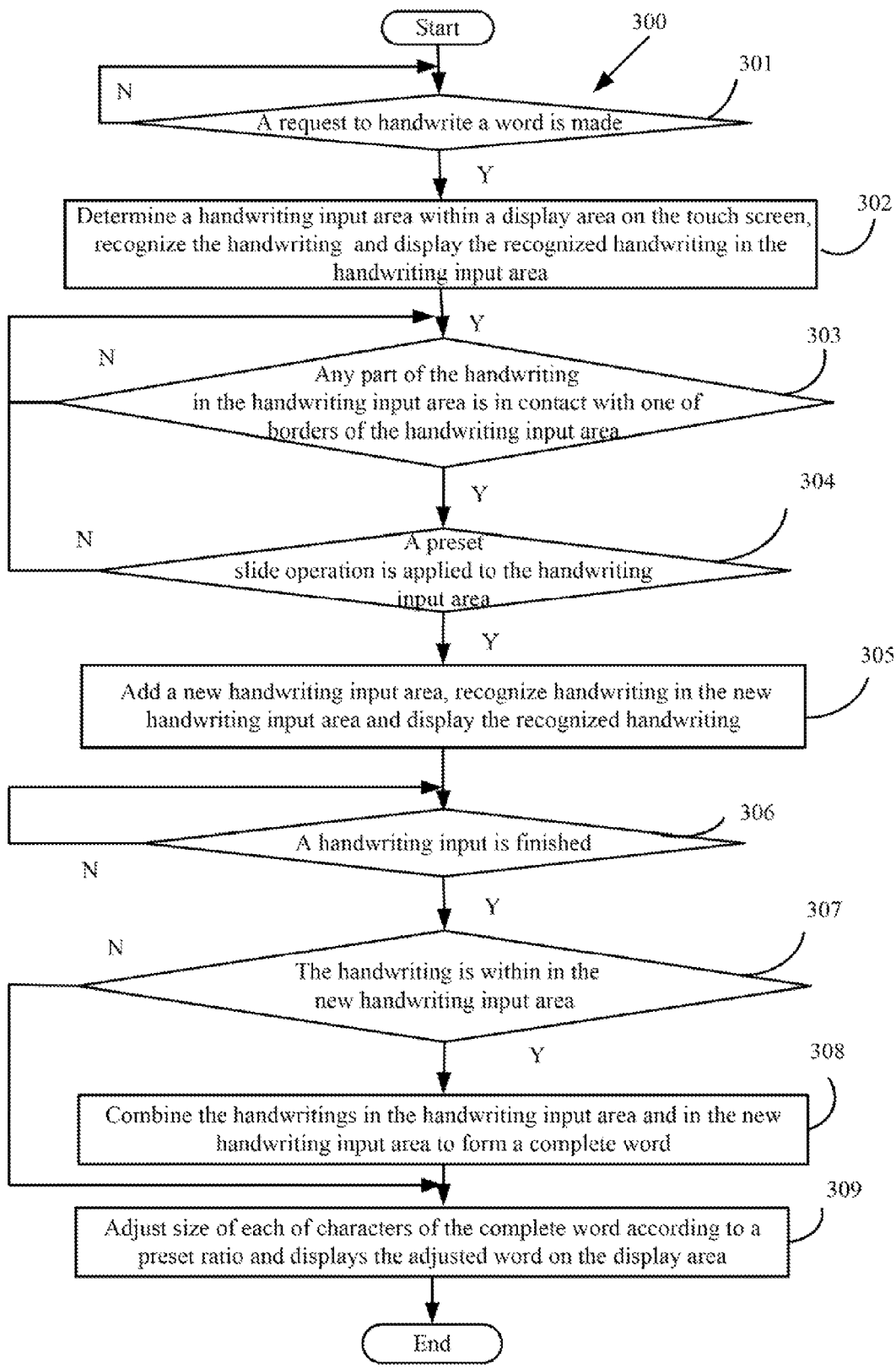
FIG. 3 is a flowchart of one embodiment of a handwriting recognition method.

FIG. 3 illustrates a flowchart of one embodiment of a handwriting recognition method. The example method 300 is provided by way of example, as there are a variety of ways to carry out the method. The method 300 described below can be carried out using the configurations illustrated in FIGS. 1 and 2, for example, and various elements of these figures are referenced in explaining example method 300. Each block shown in FIG. 3 represents one or more processes, methods, or subroutines, carried out in the exemplary method 300. Additionally, the illustrated order of blocks is by example only and the order of the blocks can change. The exemplary method 300 can begin at block 301. Depending on the embodiment, additional steps can be added, others removed, and the ordering of the steps can be changed.

At block 301, the request recognition module recognizes a request being made to handwrite a word. If yes (that is, a request being made), the process goes to block 302; if no, the process goes back to block 301.

In the embodiment, a user can operate a particular touch button, icon, or menu which is displayed on the touch screen 21, to input a request to handwrite a word. In other embodiments, a user can operate a particular press key (not shown in FIGS) of the electronic device 20 to input the request. When the user operates a particular touch button, icon, or menu displayed on the touch screen 21, or a particular press key of the electronic device 20, the request recognition module 11 recognizes that a request is being made.

At block 302, the determination module determines a handwriting input area within a display area on the touch screen. Upon characters being traced by hand in the handwriting input area, the handwriting recognition module recognizes the handwriting and displays the recognized handwriting in the handwriting input area.

Figure 4:
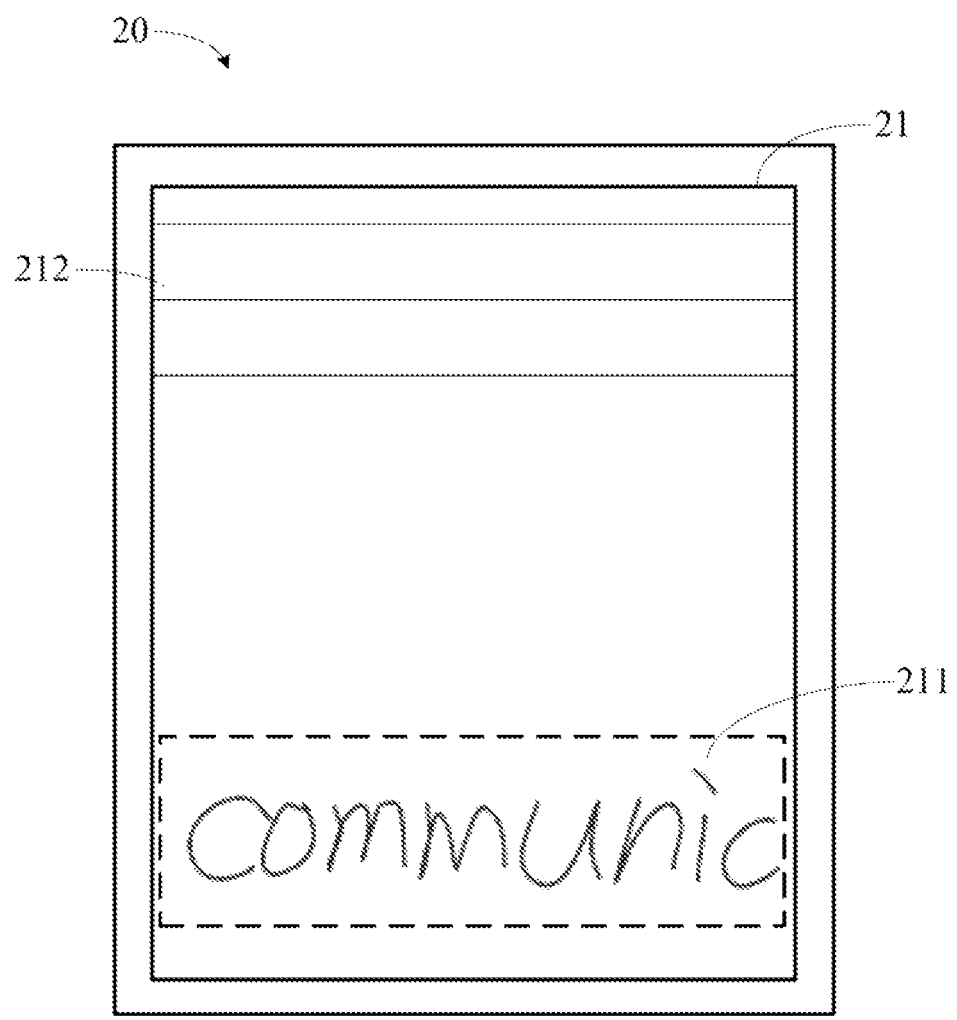
FIG. 4 is a diagrammatic view of one embodiment of a first display state of a handwritten word or part of a word.

FIG. 4 illustrates a diagrammatic view of one embodiment of a first display state of a handwritten word. The handwriting input area 211 receives handwriting input. The display area 212 displays handwritten words or a part of a word associated with the handwriting input. When a handwritten word includes more than one character, each of characters of the word is displayed on the display area 212 according to an order of the input of characters.

In the embodiment, area of the display area 212 is smaller than area of a display provided by the touch screen 21. The handwriting input area 211 and the display area 212 are separately displayed on the touch screen 21. In an alternative embodiment, the handwriting input area 212 is located over the display area 212. The area of the display area 212 can equal the area of the display provided by the touch screen 21.

In the embodiment, the determination module 12 displays borders of the handwriting input area 211 on the touch screen 21, for example, as the broken lines shown in FIG. 4, to indicate a region of the handwriting input area 211.

In the embodiment, the handwriting recognition module 13 recognizes a handwriting in the handwriting input area 211 in response to signals generated by the touch screen 21 when a handwriting input is applied on the handwriting input area 211.

At block 303, the determination module determines whether any part of the handwriting in the handwriting input area is in contact with one of borders of the handwriting input area. If yes, the process goes to block 304; if no, the process goes to block 306.

When coordinates of any handwriting are same as coordinates of one border of the handwriting input area 211, the determination module 12 determines that the handwriting in the handwriting input area is in contact with one border of the handwriting input area 211.

When the handwriting input on the handwriting input area 211 is finished and the handwriting associated with the handwriting input does not contact one of borders of the handwriting input area 211, the handwriting lying in the handwriting input area 211 is deemed to form a whole word. When the handwriting input on the handwriting input area 211 is finished and the handwriting associated with the handwriting input contacts one of borders of the handwriting input area 211, the handwriting in the handwriting input area 211 is deemed to form an incomplete word.

At block 304, the determination module determines whether a preset slide operation is applied to the handwriting input area. If yes, the process goes to block 305; if no, the process goes to block 306.

In an alternative embodiment, the block 303 can be omitted.

When a preset slide operation is not applied to the handwriting input area 211, the handwriting in the handwriting input area 211 is deemed to form a complete word. When a preset slide operation is applied to the handwriting input area 211, the handwriting in the handwriting input area 211 is deemed to form an incomplete word.

At block 305, the determination module adds a new handwriting input area on the touch screen. The handwriting recognition module recognizes handwriting in the new handwriting input area and displays the recognized handwriting on the new handwriting input area.

In the embodiment, a starting point of the preset slide operation lies in one of borders or vertexes of the handwriting input area 211, and the sliding direction is towards the direction of the handwriting. In another embodiment, the sliding direction is toward the opposite direction of the handwriting. The determination module 12 adds and displays the new handwriting input area 213 adjacent to/in place of the handwriting input 211. Moreover, area of the new handwriting input area 213 is positively correlated with a slide distance of the slide operation. That is, the slide distance is longer, the area of the new handwriting input area 213 is larger.

Figure 5:
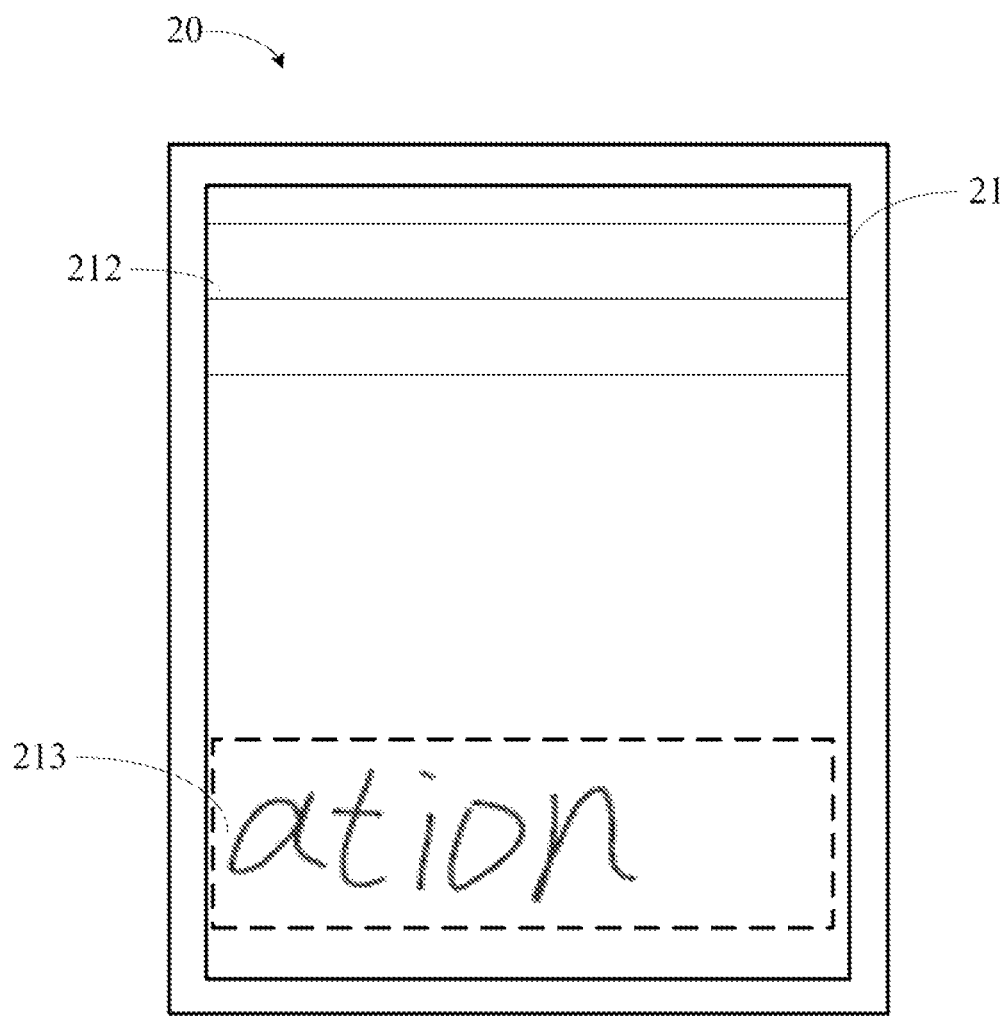
FIG. 5 is a diagrammatic view of one embodiment of a second display state of a handwritten word or part of a word.

FIG. 5 is a diagrammatic view of one embodiment of a second state of a handwritten word. The determination module 12 only displays the new handwriting input area 213 on the touch screen 21.

Figure 6:
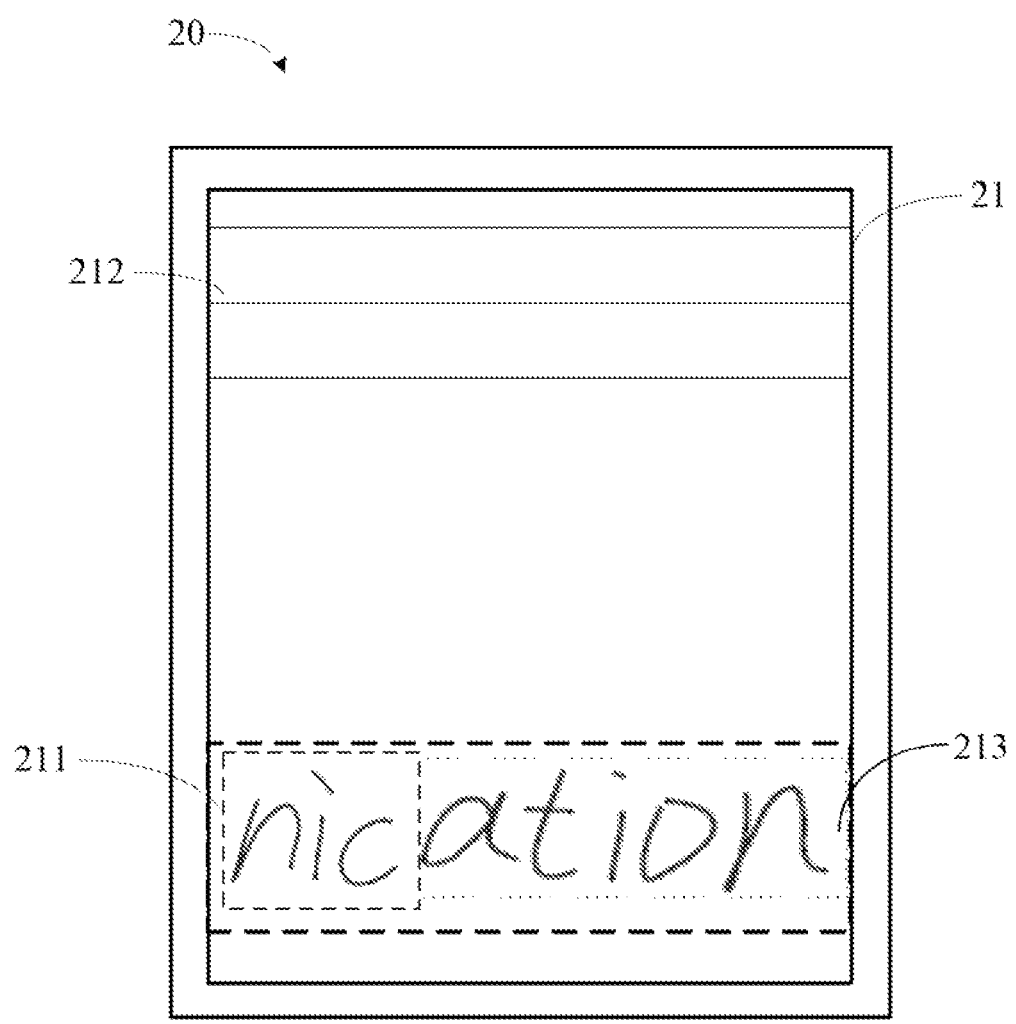
FIG. 6 is a diagrammatic view of an alternative embodiment of a second display state of a handwritten word or part of a word.

FIG. 6 illustrates a second state of a handwritten word according to another embodiment. The determination module 12 simultaneously displays the new handwriting input area 213 and the original handwriting input area 211 on the touch screen 21. In the embodiment, when the new handwriting input area 213 is smaller than the handwriting input area 211, the determination module 12 simultaneously displays as much of the handwriting input area 211 as available space allows and a whole of the new handwriting input area 213. For example, a portion of the original handwriting input area 211 is near to the new handwriting input area 213, and both areas are displayed on the touch screen 21, as shown in FIG. 6. The borders of the handwriting input area 211 and of the new handwriting input area 213 are shown as two different broken lines (see FIG. 6).

At block 306, the determination module determines whether a handwriting input is finished. If yes, the process goes to block 307; if no, the process goes back to block 306.

In the embodiment, the determination module 12 determines that a handwriting input is finished when there is no input in the handwriting input area 211 or in the new handwriting input area 213 for a predefined time interval such as 5 seconds.

At block 307, the determination module determines whether the handwriting is within the new handwriting input area. If yes, the process goes to block 308; if no, the process goes to block 309.

At block 308, the combination module combines the handwritings in the handwriting input area and in the new handwriting input area to form a complete word.

At block 309, the adjustment module adjusts size of each of characters of the complete word, according to a preset ratio, and displays the adjusted word on the display area.

In the embodiment, the adjustment module can minimize each of characters of the word according to a preset minimization ratio to ensure a consistent size of each character of the word.

Figure 7:
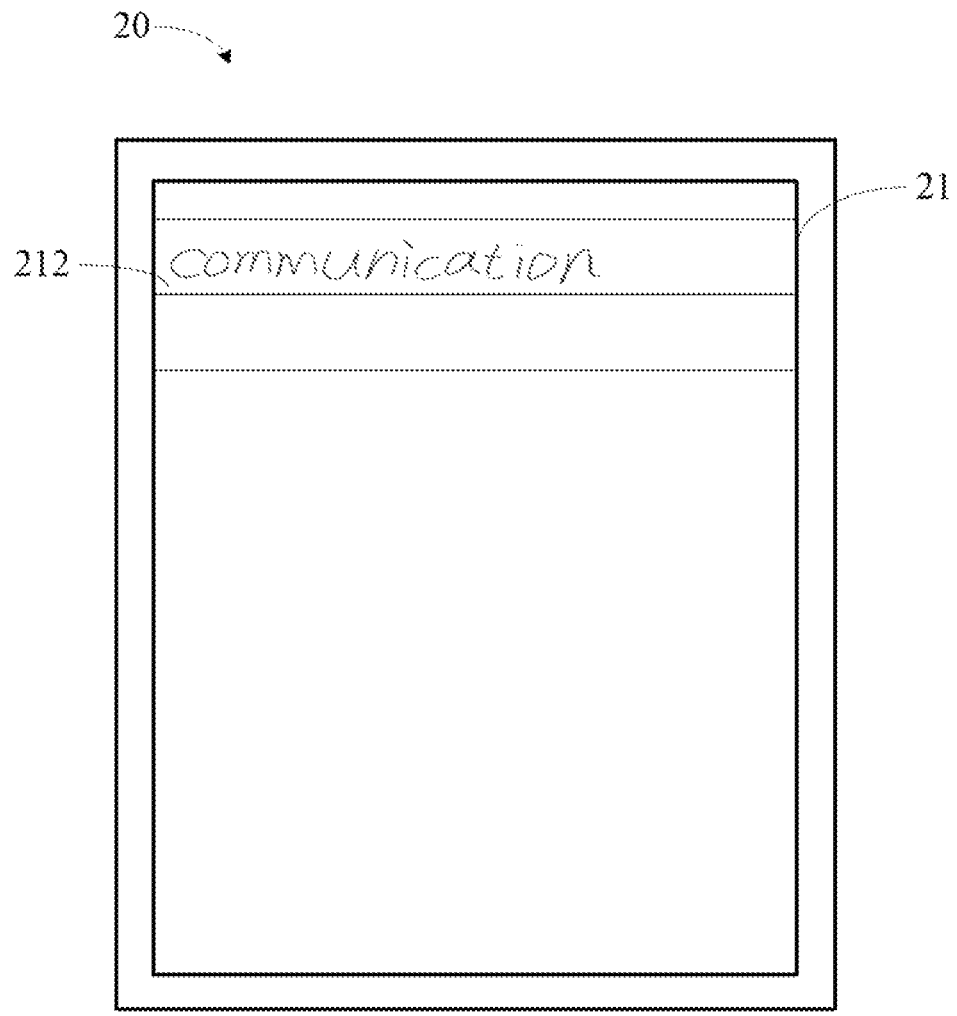
FIG. 7 is a diagrammatic view of an alternative embodiment of a third display state of a handwritten word or part of a word.

FIG. 7 shows a complete handwritten word recognized by the handwriting recognition system 10, in accordance with one embodiment.

The embodiments shown and described above are only examples. Many details are often found in the art and many such details are therefore neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A handwriting recognition method executable by at least one processor of an electronic device, the method comprising:
   recognizing a handwriting in a handwriting input area and displaying the recognized handwriting in the handwriting input area;
   determining whether any part of the handwriting in the handwriting input area is in contact with one of borders of the handwriting input area;
   determining whether a preset slide operation is applied to the handwriting input area when determining any part of the handwriting in the handwriting input area is in contact with one of borders of the handwriting input area;
   adding a new handwriting input area according to the slide operation when the preset slide operation is applied to the handwriting input area;
   recognizing a handwriting in the new handwriting input area and displaying the recognized handwriting in the new handwriting input area;
   determining whether a handwriting input is finished;
   combining the handwritings in the handwriting input area and in the new handwriting input area to form a complete word upon determining that the handwriting input is finished; and
   displaying the complete word.

2. The handwriting recognition method according to claim 1, wherein before the complete word is displayed, the method further comprises:
   adjusting size of each of characters of the complete word according to an adjustment ratio.

3. The handwriting recognition method according to claim 1, wherein a starting point of the preset slide operation lies in one of borders or vertexes of the handwriting input area, and the sliding direction is towards to a direction of the handwriting.

4. The handwriting recognition method according to claim 1, wherein a starting point of the preset slide operation lies in one of borders or vertexes of the handwriting input area, and the sliding direction is towards to an opposite direction of the handwriting.

5. The handwriting recognition method according to claim 4, wherein an area of the new handwriting input area is positively correlated with a slide distance of the slide operation.

6. The handwriting recognition method according to claim 1, further comprising: simultaneously displaying the handwriting input area and the new handwriting input area on the touch screen.

7. The handwriting recognition method according to claim 6, further comprising: displaying as much of the handwriting input area as available space allows and a whole of the new handwriting input area when the new handwriting input area is smaller than the handwriting input area.

8. The handwriting recognition method according to claim 1, further comprising:
   recognizing whether a request to handwrite a word is made; and
   determining a handwriting input area on a touch screen when the request to handwrite a word is made.

9. An electronic device, comprising:
   a touch screen;
   a processor; and
   a storage device that stores one or more programs which, when executed by the processor, cause the processor to:
   recognize a handwriting in the handwriting input area and displaying the recognized handwriting in the handwriting input area;
   determine whether any part of the handwritings in the handwriting input area is in contact with one of borders of the handwriting input area;
   determine whether a preset slide operation is applied to the handwriting input area when determining any part of the handwriting in the handwriting input area is in contact with one of borders of the handwriting input area;
   add a new handwriting input area according to the slide operation when the preset slide operation is applied to the handwriting input area;
   recognize a handwriting in the new handwriting input area and display the recognized handwritings in the new handwriting input area;
   determine whether a handwriting input is finished;
   combine the handwritings in the handwriting input area and in the new handwriting input area to form a complete word upon determining that the handwriting input is finished; and
   display the complete word.

10. The electronic device according to claim 9, wherein before the word is displayed, wherein the processor is further caused to adjust size of each of characters of the complete word according to an adjustment ratio.

11. The electronic device according to claim 9, wherein an area of the new handwriting input area is positively correlated with a slide distance of the slide operation.

12. The electronic device according to claim 11, wherein the handwriting input area and the new handwriting input area are simultaneously displayed on the touch screen.

13. A non-transitory storage medium having stored thereon instructions that, when executed by a processor of an electronic device, causes the processor to perform a handwriting recognition method, wherein the method comprises:

recognizing a handwriting in the handwriting input area and displaying the recognized handwriting in the handwriting input area;

determining whether any part of the handwriting in the handwriting input area is in contact with one of borders of the handwriting input area;

determining whether a preset slide operation is applied to the handwriting input area when determining any part of the handwriting in the handwriting input area is in contact with one of borders of the handwriting input area;

adding a new handwriting input area on touch screen according to the slide operation when the preset slide operation is applied to the handwriting input area;

recognizing a handwriting in the new handwriting input area and displaying the recognized handwriting in the new handwriting input area;

determining whether a handwriting input is finished;

combining the handwritings in the handwriting input area and in the new handwriting input area to form a complete word upon determining that the handwriting input is finished; and displaying the complete word.

14. The non-transitory storage medium according to claim 13, further comprising:

minimizing size of each of characters of the complete word according to a minimization ratio.

15. The non-transitory storage medium according to claim 13, wherein area of the new handwriting input area is positively correlated with a slide distance of the slide operation.

16. The non-transitory storage medium according to claim 13, wherein as much of the handwriting input area as available space allows and a whole of the new handwriting input area are simultaneously displayed when the new handwriting input area is smaller than the handwriting input area.

\* \* \* \* \*